Oct. 14, 1941.  H. J. FLIKKIE  2,259,158
STORAGE BATTERY CELL COVER ASSEMBLY
Filed March 1, 1938
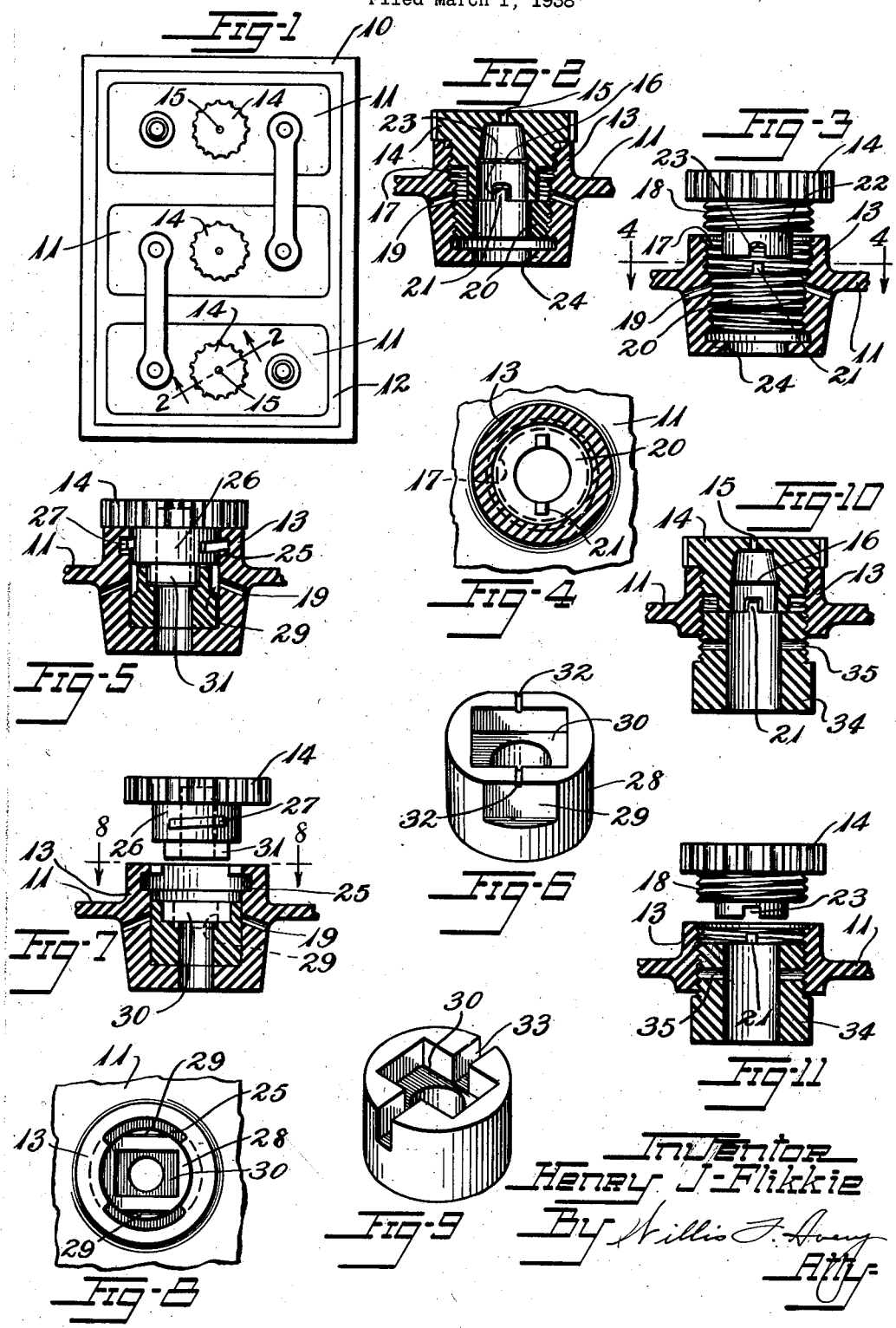

Patented Oct. 14, 1941

2,259,158

UNITED STATES PATENT OFFICE 2,259,158

STORAGE BATTERY CELL COVER ASSEMBLY

Henry J. Flikkie, Akron, Ohio, assignor to The B. F. Goodrich Company, New York, N. Y., a corporation of New York Application March 1, 1938, Serial No. 193,299

2 Claims. (Cl. 136—178)

This invention relates to storage battery cell cover assemblies and is particularly useful in eliminating acid spray.

During use, storage batteries require the addition of water and are provided with cell covers having a vent well through which the electrolyte may be tested and water added. If too much water is added to the cell, it traps gas above the bottom of the vent well. This gas eventually builds up sufficient pressure to depress the electrolyte to the level of the bottom of the vent well where the gas bubbles out, throwing an acid spray with it. While this acid spray, which occurs during charging, is inconvenient at all times, it is more inconvenient and often causes actual damage, where, as in the present tendency of design of motor cars, the battery is located in the same compartment with the motor or other delicate mechanism.

The principal objects of this invention are to provide an improved cover construction for preventing over-filling of the battery, substantially to prevent acid spray, and to provide simplicity of construction, and ease of operation.

These and other objects will appear from the following description and the accompanying drawing.

Of the drawing:

Fig. 1 is a plan view of the three cell storage battery of a type suitable for use in motor vehicles.

Fig. 2 is a sectional elevation thereof, taken on line 2—2 of Fig. 1 showing a vent well and plug assembly constructed according to and embodying the invention, the vent plug being shown as fully inserted.

Fig. 3 is a sectional elevation of the same similar to Fig. 2, but showing the vent plug and valve member in full lines and in the position assumed as the vent plug is removed.

Fig. 4 is a sectional plan view taken on line 4—4 of Fig. 3.

Fig. 5 is a vertical sectional view similar to Fig. 2, showing a modified form of vent well and plug construction, the plug being shown in full lines.

Fig. 6 is a perspective view of the rotatable valve member thereof.

Fig. 7 is a vertical sectional view like Fig. 5 but showing the plug removed from the vent well.

Fig. 8 is a plan view of the same taken on line 8—8 of Fig. 7 with the plug removed.

Fig. 9 is a view like Fig. 6 but showing a modified construction of the valve member.

Fig. 10 is a vertical sectional view of a further modification of the invention, showing the vent plug in place.

Fig. 11 is a similar view of the same with the vent plug removed and shown in full.

Referring to the drawing, the numeral 10 designates a battery case of the three cell type, each cell being provided with a cell cover 11 of hard rubber or other rigid plastic material sealed thereto by bituminous material 12. Each cell cover 11 is formed with a vent well 13 having a filler opening extending therethrough and adapted to be engaged and partially closed by a vent plug 14 of hard rubber or other suitable material, having a small vent 15 therethrough. A baffle plate 16 is usually mounted in the vent plug so as to prevent direct throw of spray through the vent.

In the form of the invention illustrated in Figs. 1 to 9 inclusive, the vent well extends below the wall of the cover to the desired liquid level.

Referring particularly to the form of the invention shown in Figs. 2 to 4 inclusive, provision is made for venting the cell above the base of the vent well when the vent or filler plug is in place and for closing such vents when the plug is not in place so as to prevent overfilling of the cell, in the following manner:

The vent well is internally threaded, as at 17, and the vent plug is externally threaded, as at 18, to engage therein. One or more vent openings 19 extend through the wall of the vent well just below the wall of the cell cover. A threaded valve member 20, of ring form, which is constructed of hard rubber or other suitable material, is externally threaded to engage corresponding threads of the vent well and is of such depth as to cover and seal the vents 19 at one position and to uncover them when screwed farther into the vent well. The interengaging threads of the well and valve member are usually met in the normal use of the battery which condition assists in maintaining a good seal against leakage of gas past the threads. The vent plug and the valve member are formed with interengaging driving means so as to be rotated in unison. For this purpose, the valve ring may be formed with one or more upwardly projecting lugs 21, and the vent plug formed with a depending skirt 22 formed with notches 23 to engage the lugs. The arrangement is such that when the vent plug is in place and the lugs engaged in their notches, the valve member will be below the vents 19 and when the vent plug is unscrewed it will back the valve member out to a position closing such vents before the vent plug leaves the threads of the vent well. The vent plug may then be lifted as in Fig. 3 and removed for filling purposes. In replacing the plug, an axial movement reengages the lugs in the notches and then by turning the vent plug, in the direction necessary to seat it, the valve member will be screwed past the vent openings. To provide against rotation of the valve member to the extent where it might be dropped into the cell, a guard member or flange 24 is formed at the lower end of the vent well. The notches 23 are made enough larger than the lugs 21 to permit passage of gas therebetween from the vents 19 to the vent 15.

Where it is desired to provide quick opening, the form of the invention shown in Figs. 5 to 8, inclusive may be used. In this form, the vent well 13 is formed with a smooth cylindrical bore and one or more bayonet joint slots 25, and the vent plug is formed with a smooth cylindrical portion 26 having one or more inclined lugs 27 for engaging therein, the arrangement being such that the plug may be seated by a single axial movement and a partial rotary movement. As shown in Fig. 6, the valve member 28 is a cylindrical ring relieved as at 29 opposite the vents 19 in one position and rotatable, by engagement with the vent plug, to a position, as shown in Fig. 7, where it closes the vents 19. To provide for rotative engagement of the vent plug and the valve member, a squared recess 30 is formed in the upper face of the valve member and a driving lug 31 for engaging therein is formed on the vent plug. Shallow grooves 32 insure exit of gases across the upper face of the valve member.

In the alternate form of valve member shown in Fig. 9 a deep wide slot 33 serves the function of both the recess 29 and the grooves 32 of the valve of Fig. 6, and is interchangeable with the valve of Fig. 6.

In the modification illustrated in Figs. 10 and 11, the vent well is of little or no extent below the cell cover wall and is threaded clear through. A threaded vent plug 14, identical to that of Fig. 2 is employed. The valve member 34 is an exteriorly threaded bushing having one or more vent holes 35 though its threaded portion communicating with its central bore. The vent holes are located so that when the valve bushing is screwed to its lower position the holes 35 are open to the space above the electrolyte and when the valve bushing is screwed to its upper position, the holes are covered by the screw threaded wall of the vent well. The valve bushing is formed with one or more lugs 21 on its upper face to engage the notches 23 in the skirt of the vent plug and to control rotation of the valve bushing when the vent plug is turned.

In any of the forms of the invention when the vent or filler plug is removed to test the cell a free passage is provided through the valve member for the passage of a hydrometer or other testing device and the vents in the sides of the passage above the fluid level are automatically closed so that it is impossible to fill the cell with fluid above the desired level which is at the bottom of the vent well assembly, whereas where the vent or filler plug is replaced the side vents are automatically opened so as to vent gas from the space below the cell cover and above the bottom of the vent well. This is accomplished without the use of metal springs or other metallic parts which might be affected by the presence of acid, and without the use of non-metallic springs which might change in strength in the presence of acid and where subjected to temperature changes.

While the invention has been shown and described as applied to a battery with individual cell covers, it will be understood that it is applicable as well to a battery having a single integral cover for the several cells.

These and further variations may be made without departing from the scope of the invention as it is defined by the following claims.

I claim:

1. A cover assembly for a container for electrolyte comprising a cover having a theaded opening therethrough, and a threaded tubular valve and filling well structure engaging in the threaded opening of said cover for bodily vertical movement upon rotation in said opening and having a portion depending below the cover for providing between the cover and a normal electrolyte level a gas-trapping space adjacent said well structure beneath the cover in the raised position of said well structure, said well structure having a vent aperture in the wall thereof so located as to be in venting communication with said space below the cover when said well structure is in its lowered position and to be closed by said cover when said well structure is in its raised, gas-trapping position.

2. A cover assembly for a container for electrolyte comprising a cover having a threaded opening therethrough, a tubular valve and filling well structure engaging in the threaded opening of said cover for bodily vertical movement upon rotation in said opening and having a portion depending below the cover for providing between the cover and a normal electrolyte level a gas-trapping space adjacent said filler well structure beneath the cover in the raised position of said well structure, said well structure having a vent aperture in the wall thereof so located as to be in venting communication with said space below the cover when said well structure is in its lowered position and to be closed by said cover when said well structure is in its raised gas-trapping position, and a vented closure member also threadedly engageable in the opening of said cover, said closure member being engageable with said well structure for rotatably moving said structure between said lowered and raised positions and being detachable from said well structure only in the raised position of the latter.

HENRY J. FLIKKIE.